Patented Sept. 10, 1929.

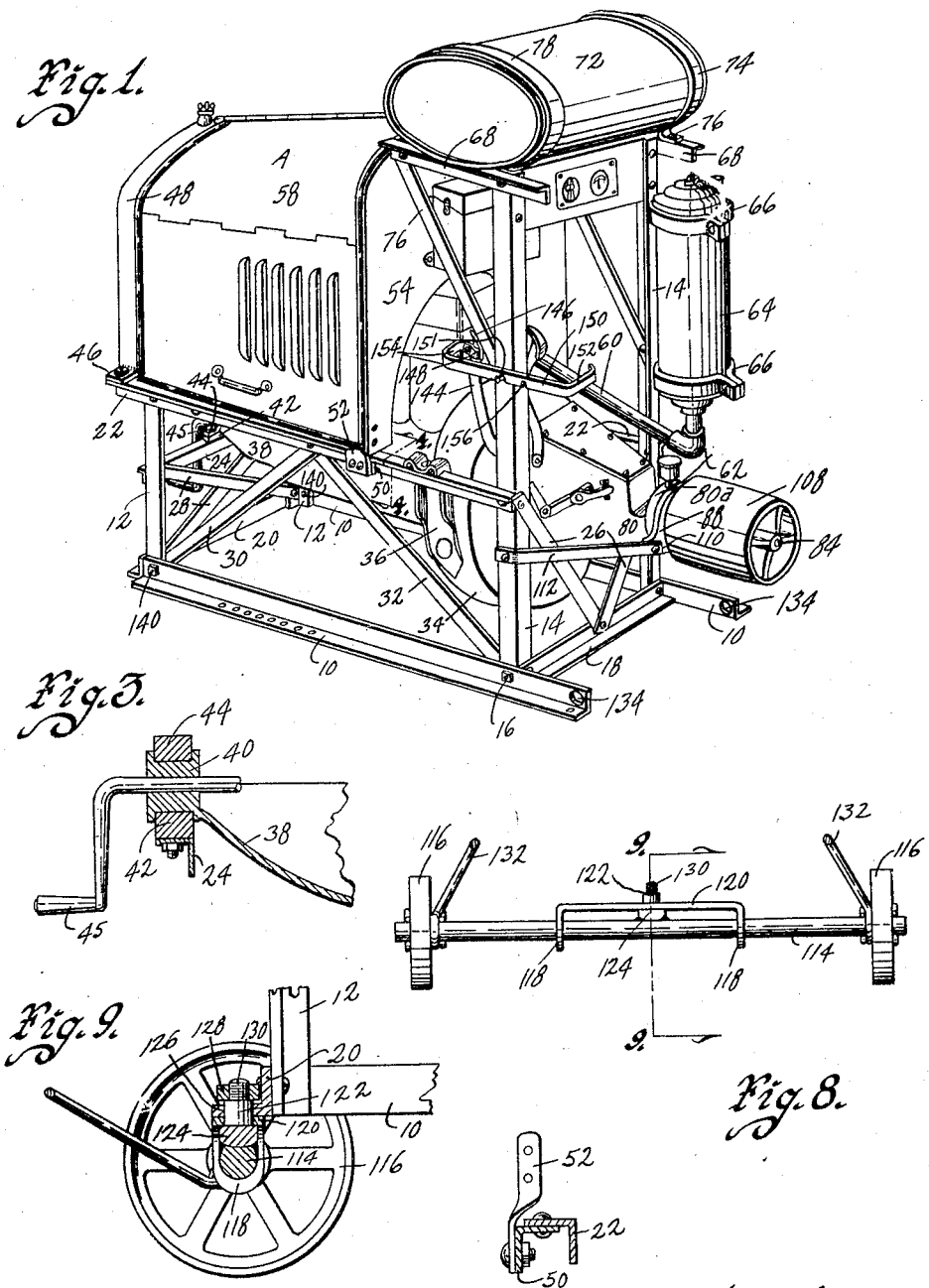

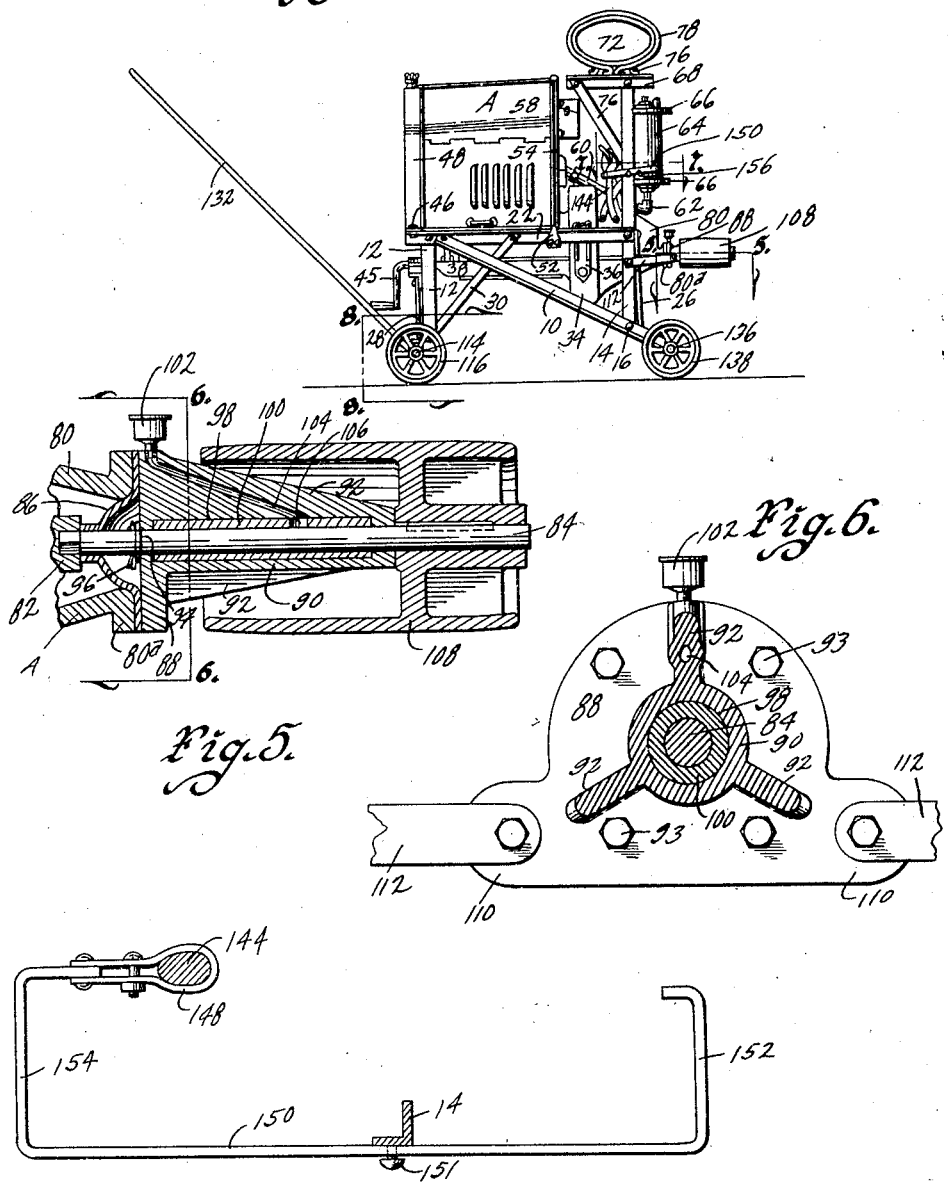

1,727,869

UNITED STATES PATENT OFFICE.

FRANK J. DULTMEIER, OF IOWA FALLS, IOWA.

MOTOR FRAME.

Application filed May 21, 1928. Serial No. 279,249.

The object of my invention is to provide a motor frame adapted to conveniently support the various parts of an automobile engine, which has been removed from the automobile chassis.

In this connection, my invention consists of various novel features making for convenience in mounting and supporting the engine and its parts on a frame in convenient position for using power from the engine.

One purpose of my invention is to provide a frame readily adaptable for being supported on a flat surface or to be modified as to positions of some of its parts for convenient installation of supporting wheels.

With these and other objects in view, my invention consists in the construction, arrangement and combination of the various parts of my motor frame, whereby the objects contemplated are attained, as hereinafter more fully set forth, pointed out in my claims, and illustrated in the accompanying drawings, in which:

Figure 1 shows a perspective view of a motor frame embodying my invention having an engine supported thereon.

Figure 2 is a side elevation of the same, the frame having been mounted on wheels.

Figure 3 is a vertical, sectional view through the upper, central portion of the frame and the front of the crank case of the engine.

Figure 4 is a detail, sectional view taken on the line 4—4 of Figure 1.

Figure 5 is a sectional view taken on the line 5—5 of Figure 2.

Figure 6 is a transverse, sectional view taken on the line 6—6 of Figure 5.

Figure 7 is a detail, sectional view taken on the line 7—7 of Figure 2.

Figure 8 is a front elevation of the detachable front axle and wheels; and

Figure 9 is a sectional view taken on the line 9—9 of Figure 8, illustrating the detachable front axle connected to the motor frame.

There are in this country a great number of engines which have been salvaged from junked automobiles. In a large number of instances, these engines are capable of considerable further use.

The present invention has to do with a convenient means for mounting such engines in a way that they may be used for various purposes.

Referring now to Figure 1, it will be seen that I have shown a frame for supporting an ordinary Ford engine, including the block and crank case, fly wheel, and transmission case, dash and radiator and hood.

The frame includes two laterally spaced angle bars, indicated by the reference numeral 10, which while the frame is in the position shown in Figure 1 are horizontal and have their lower flanges in the same horizontal plane, so that the entire frame with the motor supported thereon may be conveniently mounted on a platform or on an automobile chassis or otherwise, as may be desired.

Extending upwardly from the front ends of the respective frame members 10 are angle bars 12 for supporting the front end of the engine.

Near the rear ends of the members 10, upright angle bar frame members 14 are secured to the upright angles of the members 10 by means of bolts 16, of which one is provided for each upright 14.

The members 10 project rearwardly beyond the members 14 as shown in Figure 1. The lower ends of the members 14 are connected by a cross frame member 18, preferably having the form of an angle bar. The lower ends of the members 12 are connected by a transverse, angle bar frame member 20 having a lower, horizontal flange and a rear upright flange. The uprights 14 are considerably taller than the uprights 12.

Side frame members 22 are provided. These are angle bars which are secured near their respective forward ends to the upper ends of the respective frame members 12. Each member 22 is secured at its rear end to one of the members 14 between the ends thereof, as shown in Figure 1.

The members 12 are connected by a cross member 24 arranged substantially above the cross member 20 and below the upper ends of the members 12.

Diagonal braces 26 are secured to the cross member 12 near the middle thereof, and are inclined upwardly and laterally to the members 14, to which they are secured, preferably at about the height of the members 22.

At the front of the frame, the members 20 and 24 are preferably connected and braced by means of diagonal brace members 28.

At the sides of the frame, I preferably provide diagonal brace members 30 and 32 extending from the members 22 near the middle thereof downwardly and forwardly to the members 12 and downwardly and rearwardly to the members 14 respectively.

The engine, which I have indicated generally at A, is provided with the fly wheel case 34 from which extend the hangers 36, which are supported on the frame members 22 (see Figures 1 and 2).

At the forward end of the crank case 38, the engine is provided with a block or the like 40, which is supported on the cross frame member 24 by means of an ordinary pillow block 42 (see Figure 3) which is provided with the ordinary pillow block cap 44.

For further securing the engine on the frame, I bolt the flange 46 at the lower part of the radiator 48 on each side thereof to the appropriate frame member 22 (see Figure 1). Also I provide the small angle brackets 50 mounted on each member 22 (see Figures 1 and 4).

Secured to each bracket 50 is an upstanding bracket arm 52, which is fastened to the dash 54. Means, not shown, may be provided for holding the hood 58 detachably to the frame members 22.

The exhaust pipe 60 is provided at its rear end with an elbow 62 above which is supported the muffler 64. The muffler 64 is held in place by means of split ring clamps 66 on one of the uprights 14 (all as shown in Figure 1).

At the upper ends of the members 14 are forwardly projecting angle frame members 68, the forward ends of which are supported on the members 14 by means of diagonal braces 70. A gasoline tank 72, which may be of the kind which can be salvaged from Ford cars, is supported on the frame members 68 in the manner shown in Figures 1 and 2.

At one end, a strap 74 is extended partially around the tank 72 and has its ends fastened to one of the members 68 on opposite sides of the tank 72 as at 76 (see Figure 1). At the other end of the tank 72 is a metal strap 78 extending substantially entirely around the tank 72 and fastened below the center of the tank to the other of the frame members 68 as shown in Figure 2.

As a part of the motor frame, I provide at the rear end of the transmission case 80, the following structure:

In Figure 5, I have shown the rear end of the shaft 82, which is the shaft driven from the transmission. I have shown connected with the shaft 82 a rearwardly projecting shaft 84. The member 86 is a part of the universal joint casing.

For closing the rear end of the crank case 80 for holding the casing member 86 in place, where it serves to support the shaft 84, I have provided a special plate 88 from which there projects a hub 90 for receiving and supporting the shaft 84, which projects rearwardly beyond the hub 90, as shown in Figure 5.

Inclined wings or fins 92, preferably three in number, connect the hub 90 with the plate 88 for strengthening purposes.

The plate 88 is secured to the flange 80$^a$ by means of suitable bolts 92. The shaft 84 is held against endwise movement to the right from its position shown in Figure 5 by means of a washer 94 and a cotter pin or the like 96.

The hub 90 may have a suitable recess 98 on its interior to receive a babbitt 100.

One of the fins or wings 92 may be provided with an oil cup 102 for supplying lubricant through a passage 104 to the babbitt 100 and through the hole 106 therein to the shaft 84 (see Figures 5 and 6).

Mounted on the outer end of the shaft 84 is a pulley 108 from which power may be transmitted to other machinery by means of a belt.

I find that the rigidity of the engine support may be improved by providing the plate 88 with the ears 110 near its lower portion and by extending braces 112 from the ears 110 laterally to the upright frame members 14, as shown in Figures 1 and 6.

A frame of this kind affords a strong, rigid support for an engine.

An engine supported on a frame in the manner herein explained can be used for a great variety of purposes on farms. It can be used in small factories and in many situations where a small stationary or small portable power plant is desired.

The fact that nearly all workmen know something about the construction and operation of Ford engines makes it peculiarly easy to hire men who can use a power plant of the kind herein considered.

The frame members 10 may be bolted to a concrete base if necessary.

The entire assembly shown in Figure 1 can be lifted and placed on a truck by four men.

Such a power plant can be used for wood sawing, grinding grain, cutting ensilage, operating a washing machine, cream separator, corn sheller and various other pieces of farm machinery.

The frame has been so constructed as to peculiarly facilitate its transformation into a portable frame.

By providing an axle 114 with small wheels 116 at the ends and mounting the arms 118 of a U-shaped bracket 120 on the axle, and extending through the member 120 the smoother shank 122 of a bolt, and then welding the head 124 of the bolt to the shaft 118, it will be seen that the shank 122 can be extended through a suitable hole 126 in the horizontal flange of the frame member 20 (see Figures 1, 8 and 9), which flange thereupon rests on the member 120, and then putting the nut 128 on the reduced, threaded, upper portion 130 of the shank 122, the front end of the frame may be conveniently provided with a suitable truck.

I preferably use handle members 132 for the axle 114.

I provide in the upright flanges of the members 10 at the rear ends, the holes 134, through which an ordinary axle 136 may be extended. On the axle 136 may be mounted wheels 138 similar to the wheels 116.

If the same kind of wheels are used in the front and the rear, it will be seen that the use of the structure shown in Figure 8 raises the front end of the frame.

The use of some such structure is necessary in order to be able to steer the front wheels, which, of course, is made possible in the present case by the fact that the shank 122 can rotate in the frame member 20.

In order then to keep the whole device level when the axle 136 and wheels 138 are used, I remove the bolts 140 by which the front ends of the frame members 10 are secured to the frame members 12 and lift the front ends of the frame members 10 upwardly, and put the bolts 140 through holes 142 in the frame members 22, thus adjusting the members 10 to their positions shown in Figure 2, whereupon, of course, the rear ends of the members 10 will have been so adjusted that the axle 136 will stand at the same height above the ground as the axle 114.

I consider this feature of importance.

I have provided a clutch control structure, which I will now describe.

In Figure 1, I have shown the ordinary clutch control arm 144, having the pedal 146.

I have provided a clamp 148 (see Figure 7) for the arm 144. A bar 150 is extended substantially horizontally alongside one of the uprights 14 above a headed pin 151, and is provided at one end with a handle 152, and at the other end with a laterally, extending portion 154 connected with the clamp 148.

The bar 150 is provided with a pair of notches 156 (see Figures 1 and 2) to coact with the pin 151.

When it is desired to move the arm 144 its maximum distance to the left (see Figure 1) the operator grasps the handle 152 and lifts the bar 150 slightly and pushes forwardly. This throws the ordinary Ford into low. The parts may be held in their then adjusted position by dropping the bar 150 until the pin 151 is received in the rearward notch 156.

If the operator wants to leave the transmission in neutral, he drops the bar 150, so that the pin 151 stands in the forward notch 156.

A Ford clutch pedal normally stands, of course, in its rearward position in "high."

It is obvious from the foregoing that there is provided a very convenient motor supporting frame, and it will be readily seen that numerous changes could be made in the construction and arrangement of the various parts of the frame without departing from the real spirit and purpose of my invention, and it is therefore my purpose to cover by my claims any such changes or modifications or any use of mechanical equivalents, which may be reasonably and properly included within the scope of such claims.

I claim as my invention:

1. A frame for supporting a motor comprising a pair of laterally spaced bottom side frame members, a pair of laterally spaced upright front frame members to which said first frame members are detachably connected, transverse frame members connecting the front upright frame members near their lower ends and to points spaced substantially above their lower ends, rear upright members pivoted to said first-named side members to permit said side members to project rearwardly beyond the rear upright members, upper side frame members connected to the upper ends of the forward upright members and to the intermediate portions of the upright members, means for supporting an axle for horizontal swinging movement below the lower, forward, transverse frame member, means for mounting an axle in the rear ends of the first frame members, means for securing the forward ends of the first frame members to the upper side frame members for tilting said first side members and thus relatively lowering the rear ends thereof.

2. In a device of the class described, a frame, having four upright corner members, vertically spaced transverse frame members connecting the forward corner members, vertically spaced side frame members connecting the front with the rear corner members, the lower side members being pivoted to the lower ends of the rear upright members and detachably selectively connectible either with the lower ends of the forward upright members or with the upper side members.

3. In a device of the class described, a frame, having four upright corner members, vertically spaced transverse frame members connecting the forward corner members, vertically spaced side frame members connecting the front with the rear corner members, the lower side members being pivoted to the lower ends of the rear upright members and detachably selectively connectible either with the lower ends of the forward upright members or with the upper side members, an axle, means for mounting the axle beneath the forward, lower transverse frame member for horizontal, swinging movement, a second axle mounted in the rear ends of the lower side frame members, and wheels on said axles.

4. In a device of the class described, a frame having laterally spaced lower side members, laterally spaced forward upright members, laterally spaced rearward upright members, and laterally spaced upper side members, a motor supported on said frame having a controlling arm, a bar pivotally connected with said arm and having an adjustable connection with one of said upright members, said adjustable connection including means for locking said bar in different positions.

5. In a device of the class described, a frame comprising laterally spaced front upright members, laterally spaced rear upright members, transverse members connecting the respective front upright members, a transverse member connecting the respective rear upright members, vertically spaced side members at each side of the frame connecting the respective forward with the respective rearward upright members, a motor supported on said frame having a transmission case with a shaft projecting rearwardly therefrom, a plate through which said shaft is extended secured to said transmission case, means for supporting said plate from the rear upright members of the frame, said plate having a longitudinally extended hub with reinforcing fins radially tapered from one end to the other.

6. In a device of the class described, a frame comprising laterally spaced front upright members, laterally spaced rear upright members, transverse members connecting the respective front upright members, a transverse member connecting the respective rear upright members, vertically spaced side members at each side of the frame connecting the respective forward with the respective rearward upright members, a motor supported on said frame having a transmission case with a shaft projecting rearwardly therefrom, a plate through which said shaft is extended secured to said transmission case, means for supporting said plate from the rear upright members of the frame, said plate having a longitudinally extended hub with reinforcing fins radially tapered from one end to the other, a pulley journaled on the outer part of said shaft and having a portion overhanging the overhanging portions of said fins.

7. In a device of the class described, a motor supporting frame having laterally spaced, lower, longitudinal frame members, laterally spaced forward upright frame members secured to the first frame members, vertically spaced, transverse frame members connecting the said forward upright members, rear upright members connected to said first frame members, longitudinal frame members spaced above said first frame members secured at their forward ends to the forward upright members and at their rearward ends to the rear upright members, a motor, means for supporting a portion of the motor on the upper forward transverse member, means for supporting a portion of the motor on the upper, longitudinal side frame members, means for supporting a fuel tank at the upper end of the rear upright members and in position to deliver fuel by gravity to the motor, and a clutch control on one of the rear upright members, and a muffler support on the other of said rear upright members.

8. In a device of the class described, a frame comprising laterally spaced front upright members, laterally spaced rear upright members, transverse members connecting the respective front upright members, a transverse member connecting the respective rear upright members, vertically spaced side members at each side of the frame connecting the respective forward with the respective rearward upright members, a motor supported on said frame having a transmission case with a shaft projecting rearwardly therefrom, a plate through which said shaft is extended secured to said transmission case, means for supporting said plate from the rear upright members of the frame, said plate having a longitudinally extended hub with reinforcing fins radially tapered from one end to the other, a pulley journaled on the other part of said shaft and having a portion overhanging the overhanging portions of said fins, said motor having a transmission case, plates secured to the rear end thereof, a shaft projecting through said plate, and means for bracing the plate on the rear upright frame members.

Des Moines, Iowa, March 17, 1928.

FRANK J. DULTMEIER.